(12) United States Patent
Bergljung et al.

(10) Patent No.: US 9,294,910 B2
(45) Date of Patent: Mar. 22, 2016

(54) RELEASE-INDEPENDENT MODIFICATIONS OF NETWORK PARAMETERS

(71) Applicant: Telefonaktiebolaget L M Ericsson (publ), Stockholm (SE)

(72) Inventors: Christian Bergljung, Lund (SE); Håkan Palm, Växjö (SE); Erika Tejedor, Stockholm (SE); Anders Wallén, Ystad (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 89 days.

(21) Appl. No.: 14/114,968

(22) PCT Filed: May 8, 2013

(86) PCT No.: PCT/SE2013/050517
§ 371 (c)(1),
(2) Date: Dec. 20, 2013

(87) PCT Pub. No.: WO2014/055006
PCT Pub. Date: Apr. 10, 2012

(65) Prior Publication Data
US 2014/0140290 A1    May 22, 2014

Related U.S. Application Data

(60) Provisional application No. 61/708,444, filed on Oct. 1, 2012.

(51) Int. Cl.
*H04W 8/24* (2009.01)

(52) U.S. Cl.
CPC ...................................... *H04W 8/24* (2013.01)

(58) Field of Classification Search
None
See application file for complete search history.

(56) References Cited

U.S. PATENT DOCUMENTS

| 2006/0264217 | A1* | 11/2006 | Shaheen | 455/445 |
| 2008/0123607 | A1* | 5/2008 | Jokela | 370/338 |
| 2011/0205976 | A1* | 8/2011 | Roessel et al. | 370/329 |
| 2011/0319119 | A1* | 12/2011 | Ishii | H04L 5/0007 455/522 |
| 2012/0231834 | A1* | 9/2012 | Seo | H04W 52/32 455/522 |

(Continued)

FOREIGN PATENT DOCUMENTS

| WO | 2006124840 A1 | 11/2006 |
| WO | 2007116337 A2 | 10/2007 |

OTHER PUBLICATIONS

Ericsson, et al., "5 MHz channel bandwidth in Band 13", TSG-RAN Working Group 4 (Radio) meeting #64 bis,Santa Rosa, US, Oct. 8, 2012, pp. 1-3, R4-12xxxx, 3GPP.

(Continued)

*Primary Examiner* — Chirag Shah
*Assistant Examiner* — Suk Jin Kang
(74) *Attorney, Agent, or Firm* — Coats & Bennett, PLLC

(57) ABSTRACT

A UE indicates its radio access capabilities to the base station. An element is added to the radio access capabilities reported by the UE, to indicate in a release-independent manner if a certain network signaling parameter (e.g., NS-value) has been modified or if a new parameter has been introduced for an operating band. In this manner, the base station can distinguish UE with a modified NS-value behavior from legacy UE for the purpose of admission control, imposing scheduling or handover restrictions, or the like.

19 Claims, 4 Drawing Sheets

(56) References Cited

U.S. PATENT DOCUMENTS

| | | | |
|---|---|---|---|
| 2013/0039289 A1* | 2/2013 | Lee | H04W 52/367 370/329 |
| 2013/0115997 A1* | 5/2013 | Immonen | H04W 52/367 455/522 |
| 2013/0148591 A1* | 6/2013 | Lim | H04W 72/0453 370/329 |
| 2013/0182661 A1* | 7/2013 | Piipponen | H04W 72/0473 370/329 |
| 2013/0188563 A1* | 7/2013 | Kim | H04W 52/365 370/328 |
| 2014/0044023 A1* | 2/2014 | Kazmi et al. | 370/278 |
| 2014/0066057 A1* | 3/2014 | Kazmi et al. | 455/433 |
| 2014/0113645 A1* | 4/2014 | Sagae | H04W 52/146 455/452.1 |
| 2014/0213268 A1* | 7/2014 | Sagae | H04L 5/001 455/450 |
| 2014/0248889 A1* | 9/2014 | Van Lieshout et al. | 455/450 |
| 2015/0031410 A1* | 1/2015 | Lim | H04W 52/146 455/522 |
| 2015/0043363 A1* | 2/2015 | Koskinen et al. | 370/252 |
| 2015/0111608 A1* | 4/2015 | Kazmi | H04W 52/18 455/522 |
| 2015/0208346 A1* | 7/2015 | Piipponen | H04W 52/36 455/574 |
| 2015/0230254 A1* | 8/2015 | Lim | H04W 72/0453 370/329 |

OTHER PUBLICATIONS

3GPP TSG-RAN WG4, Change Request 36.101 CR 1324, rev 2, Current version: 11.1.0, Meeting #64, QingDao, P.R. China, Aug. 13-17, 2012, R4-124995, Sections 5.5A-7.6.2.1A.

* cited by examiner

```
-- ASN1START

UE-EUTRA-Capability ::=         SEQUENCE {
    accessStratumRelease            AccessStratumRelease,
    ue-Category                     INTEGER (1..5), < Fields with information that is sometimes tied
to a certain release of the specification >

NetworkSignalingVersion ::=                 {
    < bitmap >
}

}

--ASN1STOP
```

FIG. 1

RELEASE-INDEPENDENT MODIFICATIONS OF NETWORK PARAMETERS

FIELD OF INVENTION

The present invention relates generally to wireless communication networks, and in particular to a system and method of signaling mobile terminal capabilities regarding release-independent modifications of radio parameters.

BACKGROUND

Modern wireless communication networks have experienced unprecedented growth, both in technological sophistication (and concomitant features and capabilities) and in terms of geographic deployment and number of subscribers. This growth is facilitated—and indeed is largely possible as a result of—the codification of key technical details of wireless communication network structure and operation in a series of industry-wide specifications. The Third Generation Partnership Project (3GPP) is a collaboration between groups of telecommunications associations, which propose, agree upon, and publish technical standards for third generation networks and beyond. The 3GPP publishes the standards governing the operation of the Universal Mobile Telecommunications System (UMTS), a successor to the Global System for Mobile Communications (GSM), and its Radio Access Network (RAN), the UMTS Terrestrial Radio Access Network (UTRAN). The 3GPP has further evolved the UTRAN and GSM based radio access network technologies, specifying, e.g., High Speed Downlink/Uplink Packet Access (HSDPA/HSUPA), Multiple-Input Multiple-Output (MIMO) transmission schemes, and the like.

The specifications governing operation of each of these technological advances are published as a major revision, or "release" of the 3GPP standard. Mobile terminals, more generally referred to as user equipment (UE), are designed in conformance with, and certified to be compatible with, a particular release of the 3GPP standard. For example, HSDPA is specified in Release 5; HSUPA is specified in Release 6. The 3GPP defined an Evolved UTRA or E-UTRA, also known as Long-Term Evolution or LTE in Release 8. A UE may be assumed to be compatible with a particular 3GPP Release for which it is certified; however, it cannot be expected to comply with features specified in latter releases of the standard (operating bands specified in a later release being one common exception).

As spectrum is being freed in a certain area, new mobile technologies can be adopted. If there is already a frequency band defined in 3GPP that partly or fully coincides with the new spectrum, there is a large benefit if this band is adopted for operation in the new spectrum. For example, it gives an economical advantage in terms of already developed equipment. On the other hand, new transmission restrictions may be imposed to ensure compatibility with existing spectrum allocations in the area where the frequency band is being adopted—that is, to ensure that a newly deployed wireless network does not cause interference with existing communication systems being used in frequencies close to the newly freed spectrum.

The LTE technology defines certain signaling between the base station and the user equipment, known as network signaling (NS). A network signaling value, or NS-value, is a network parameter that may be sent by the base station as part of its system information, thus indicating to UEs connecting to this cell that they need to comply with certain additional cell-specific requirements. More specifically, the NS-value is signaled in the message SystemInformationBlockType2 via the information element AdditionalSpectrum Emission. In order to facilitate compliance with these additional requirements, the NS-value may furthermore indicate that a UE is allowed to apply a certain maximum power backoff, also known as additional maximum power reduction, or A-MPR. An NS-value is tied to specific operating bands in which the UE can operate. Upon reception of the NS-value, the UE operating in that operating band is allowed to modify its maximum transmitted power as specified by the AMPR value. Several NS-values can be available for a specific operating band, but normally only a single NS-value can be signaled at a time by the cell (several NS-values can be signaled when overlapping operating bands cover the frequency range of the cell). If no specific NS-value is signaled, the default requirements apply.

A typical use of network signaling is to allow a UE operating in a given operating band to reduce its maximum transmit power to meet an unwanted or spurious emission requirement, such as an additional spurious emission requirement or spectrum emission mask that is more stringent than the generic requirement. The allowed maximum transmit power reduction may be conditioned on the frequency allocation of the desired signal and the transmission bandwidth. The additional maximum power reduction (AMPR) is associated with an NS-value; once the NS-value is configured in the cell, power reduction is allowed (according to tables in the standard, e.g., 3GPP TS 36.101).

It is possible to modify certain parameters associated with the network signaling values, such as the power reduction characteristics for a given NS-value, in newer releases of the standards. The modification may be in terms of what power reduction values are allowed and/or what spectrum emission requirements must be fulfilled. However, when such a modification is specified, the behavior of the legacy UEs already deployed will not be according to the new version of the standard. It is not possible for the network to distinguish UEs implementing a modified power reduction from legacy UEs in the network (that is, UEs compatible with an earlier release of the standard).

When deploying wireless networks in a new area the most straightforward and cost-effective approach is to "re-use" operating bands that have already been deployed elsewhere, and for which concomitant restrictions and operating parameters have already been defined. However, the new area may impose constraints that differ from those applicable to the previously deployed bands. For example, existing spectrum allocations in the new region may require additional emission protection limits in the already specified operating band.

A future release of the standard may define new NS-values addressing this constraint; however, legacy UEs will not be able to interpret the new NS-values. New network signaling cannot simply be introduced for operating bands already included in the 3GPP specifications. Legacy UEs would not recognize it, and as a consequence would consider the network to be barred.

A future release may also include new AMPR values associated with an already supported channel bandwidth in such an operating band. However, legacy UE's will not be able to interpret the NS-value in order to apply the updated power reduction, and the UE behavior would be unpredictable.

Currently, the only solution to include either new network signaling or new AMPR associated with an already supported channel bandwidth by the operating band which is not associated with the existing NS-value is to define a new operating band. That is, to define a new operating band number while keeping the frequency range with new associated NS-values.

This creates proliferation of new bands—instead of standardized, global bands—leading to fragmented spectrum and thus markets.

Furthermore, an operating band specified in a certain 3GPP release can also be supported by a UE compliant with an earlier release, which means that the release indicated by the UE in its capabilities cannot be used to distinguish between different versions of a network signaling value.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

According to one or more embodiments described and claimed herein, a UE indicates its radio access capabilities to a base station. An element is added to the radio access capabilities reported by the UE, to indicate in a release-independent manner if a certain radio parameter, such as the NS-value, has been modified or if a new parameter (e.g., NS-value) has been introduced for an operating band. In this manner, the base station can distinguish UEs with a modified behavior from legacy UEs. This allows broader re-use of operating bands by obviating the need to define new operating bands, with the same frequency range, to accommodate new parameters, such as NS-values that have changed since a given revision of network specifications.

One embodiment relates to a method of communicating between a base station and user equipment (UE), in a wireless communication network. The UE transmits, to the base station in a wireless communication network, radio access capability of the UE in an information element comprising a plurality of fields. The information element includes a field operative to indicate to the base station that the UE supports a release-independent modification to a radio parameter.

In one embodiment, the radio parameter comprises a network signaling value (NS-value).

In one embodiment, the information element includes a bitmap, with a plurality of bit position mapped to radio parameters.

In one embodiment, the information element includes an integer vector. Each position in the vector is associated with a radio parameter. The corresponding integer indicates a release number of a 3GPP standard defining a modification or addition of the radio parameter.

Another embodiment relates to a method of operating a cell of a wireless communication network by a base station. Radio access capability of a UE is received from the UE in an information element comprising a plurality of fields. The information element includes a field operative to indicate that the UE supports a release-independent modification to a radio parameter. The UE is managed in response to the UE's support of the modified radio parameter.

In one embodiment, managing the UE comprises performing admission control on the UE in response to the UE's support of the modified radio parameter.

In one embodiment, managing the UE comprises imposing scheduling restrictions on the UE in response to the UE's support of the modified radio parameter.

In one embodiment, managing the UE comprises imposing restrictions on inter-band handover of the UE in response to the UE's support of the modified radio parameter.

In one embodiment, the radio parameter comprises a network signaling value (NS-value).

In one embodiment, the information element includes a bitmap, with a plurality of bit position mapped to radio parameters in a predetermined manner.

In one embodiment, the information element includes an integer vector. Each position in the vector is associated with a radio parameter. The corresponding integer indicates a release number of a 3GPP standard defining a modification or addition of a radio parameter.

Yet another embodiment relates to a UE operative in a wireless communication network. The UE includes a transceiver operative to receive signals from, and transmit signals to, at least one base station in the network. The UE also includes memory and a controller operatively connected to the transceiver and the memory. The controller is operative to cause the transceiver to transmit to the base station, radio access capability of the UE in an information element comprising a plurality of fields. The information element includes a field operative to indicate to the base station that the UE supports a release-independent modification to a radio parameter.

In one embodiment, the radio access capability comprises a data structure stored in the memory.

In one embodiment, the radio parameter comprises a network signaling value (NS-value).

In one embodiment, the information element includes a bitmap, with a plurality of bit position mapped to radio parameters in a predetermined manner.

In one embodiment, the information element includes an integer vector. Each position in the vector is associated with a radio parameter. The corresponding integer indicates a release number of a 3GPP standard defining a modification or addition of a radio parameter.

Still another embodiment relates to a base station operative in a wireless communication network. The base station includes a transceiver operative to receive signals from, and transmit signals to, at least one UE. The base station also includes memory and a controller operatively connected to the transceiver and the memory. The controller is operative to cause the transceiver to receive from a UE, radio access capability of the UE in an information element comprising a plurality of fields. The information element includes a field operative to indicate that the UE supports a release-independent modification to a radio parameter. The controller is further operative to manage the UE in response to the UE's support of the modified radio parameter.

In one embodiment, the controller is operative to manage the UE by performing admission control on the UE in response to the UE's support of the modified radio parameter.

In one embodiment, the controller is operative to impose scheduling restrictions on the UE in response to the UE's support of the modified radio parameter In one embodiment, the controller is operative to impose restrictions on inter-band handover of the UE in response to the UE's support of the modified radio parameter In one embodiment, the radio parameter comprises a network signaling value (NS-value).

In one embodiment, the information element includes a bitmap, with a plurality of bit position mapped to radio parameters in a predetermined manner.

In one embodiment, the information element includes an integer vector. Each position in the vector is associated with a radio parameter. Wherein the corresponding integer indicates a release number of a 3GPP standard defining a modification or addition of a radio parameter.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 1 is a representative UE Radio Access Capability data structure.

DETAILED DESCRIPTION

Figure 2:
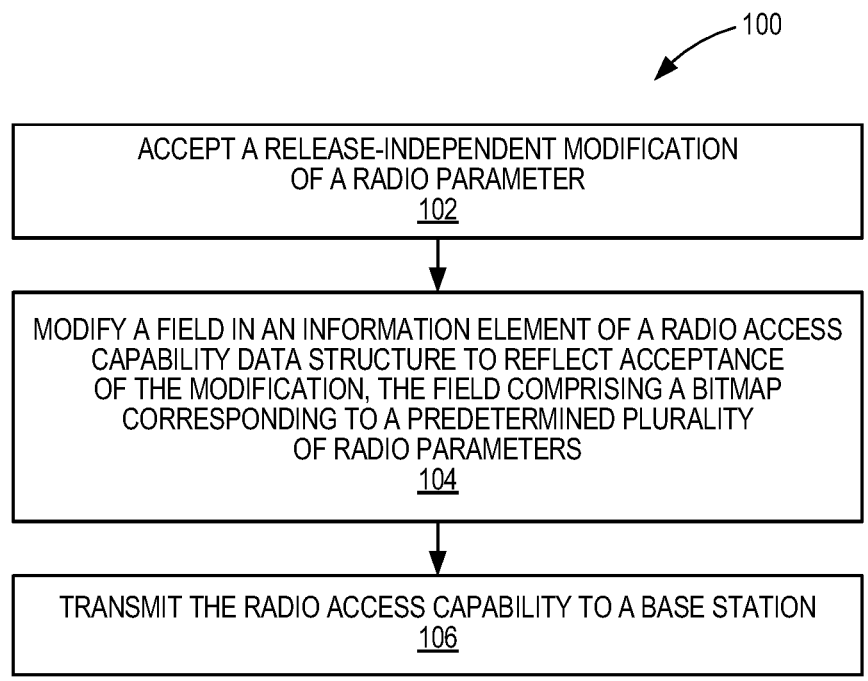
FIG. 2 is a flow diagram of a method of communicating in a network by a UE.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

At least some aspects of a UE's radio access capability are sent by a UE to the base station and signaled as an information element, which is a data structure containing a single or multiple fields. The fields are the individual contents of an information element. In LTE, fields can be added to information elements by release or in a release independent manner.

According to one embodiment of the present invention, a field is added to the UE radio capability indicating to the base station that a network specification release independent radio parameter—such as the NS-value—has been modified, or that the UE supports a new parameter.

FIG. 1 depicts one representative example of an information element (IE) used to signal radio access capability. The information element, denoted "UE-EUTRA-Capability," encodes capabilities of the UE for the E-UTRA Radio Access Technology. Numerous other fields of the UE-EUTRA-Capability IE—not depicted in FIG. 1 for clarity—may signal additional UE capability to the base station, such as half Duplex, bandListEUTRA, interFreqBandList, and the like.

FIG. 1 also depicts an additional field of the UE-EUTRA-Capability IE, which may be used to indicate to the base station that the UE supports a release-independent modification to a radio parameter. In one embodiment, the additional field is denoted "NetworkSignalingVersion" and it contains a bitmap. Each bit in the bitmap can be given a meaning, e.g., that the definition of a particular NS-value has been changed in a certain version of the 3GPP specifications. In one embodiment, a UE implementing the modified version of the NS-value, or complying with an NS-value that has been added in a later release, indicates a "1" (one) for the corresponding bit. Absence of the field "NetworkSignalingVersion" implies that the UE does not support any modified or new NS-value.

If several NS-values, associated with the existing operating bands, are modified or added, more bits are used in the bitmap, which may have a predetermined size. If the UE indicates "0" (zero) for a particular bit position, then the associated NS-value is not modified. In a different embodiment, the particular bit values may have the opposite meaning.

The field "NetworkSignalingVersion" can be added to the UE radio access capability information element in any release of the 3GPP-specification and also for UE(s) that indicate support of an earlier release in its radio access capability (accessStratumRelease for E-UTRA). This allows release-independent changes of the NS-values.

Upon receipt of the UE radio access capability, including the NetworkSignalingVersion bitmap, the base station determines whether or not the UE supports a defined or modified NS-value, and adjusts its user admission and congestion control accordingly. For example, the base station may not allow attachment by a UE that does not support a modified and/or added NS-value. As another example, the base station may admit a legacy UE which does not comply with the latest NS-values, but may impose restrictions, such as scheduling, on the UE. As another example, the base station, aware that a UE does not support certain NS-value for a frequency band employed by a handover target base station, may restrict the UE from an inter-band handover.

Thus, in one embodiment, the NetworkSignalingVersion is a bitmap comprising binary values indicative of whether or not certain NS-values have been modified or not, and in which release the modification is introduced.

In another embodiment, the NetworkSignalingVersion additionally includes a vector of integers, indicating with which release of the 3GPP specification a particular NS-value complies. This provides alternative means of having the NS-value redefined multiple times at later stages of the specification, and in the order of the 3GPP release. In another embodiment, multiple fields in an information element may be added to capture the information. For example, one field for each new 3GPP release may be added, each field consisting of a bitmap corresponding to compliance with NS-values according to that particular release.

FIG. 2 depicts a method 100 of communicating acceptance of modified radio parameters in radio access capability by a UE in a wireless communication network. The UE accepts a release-independent modification of a radio parameter, such as a NS-value (block 102). This may be done as part of a software or firmware upgrade of the UE, such as Firmware Over The Air (FOTA) update or an update at a service center. The UE modifies (or accepts a modification as part of the software or firmware upgrade) a field of an information element of a radio access capability data structure to reflect acceptance of the modification (block 104). In one embodiment, the field is labeled NetworkSignalingVersion. In one embodiment, the field comprises a bitmap corresponding to a predetermined plurality of radio parameters, such as NS-values. As part of the negotiation process of attaching to a base station to join a cell of a wireless network, the UE transmits to a base station the radio access capability, including the field indicating acceptance of modified radio parameters (block 106). The base station may then manage the UE, such as performing access control, based on the UE's support of modified radio parameters. In particular, the base station may admit only UEs that accept certain modified and/or new NS-values, and refuse attachment to other UEs.

Figure 3:
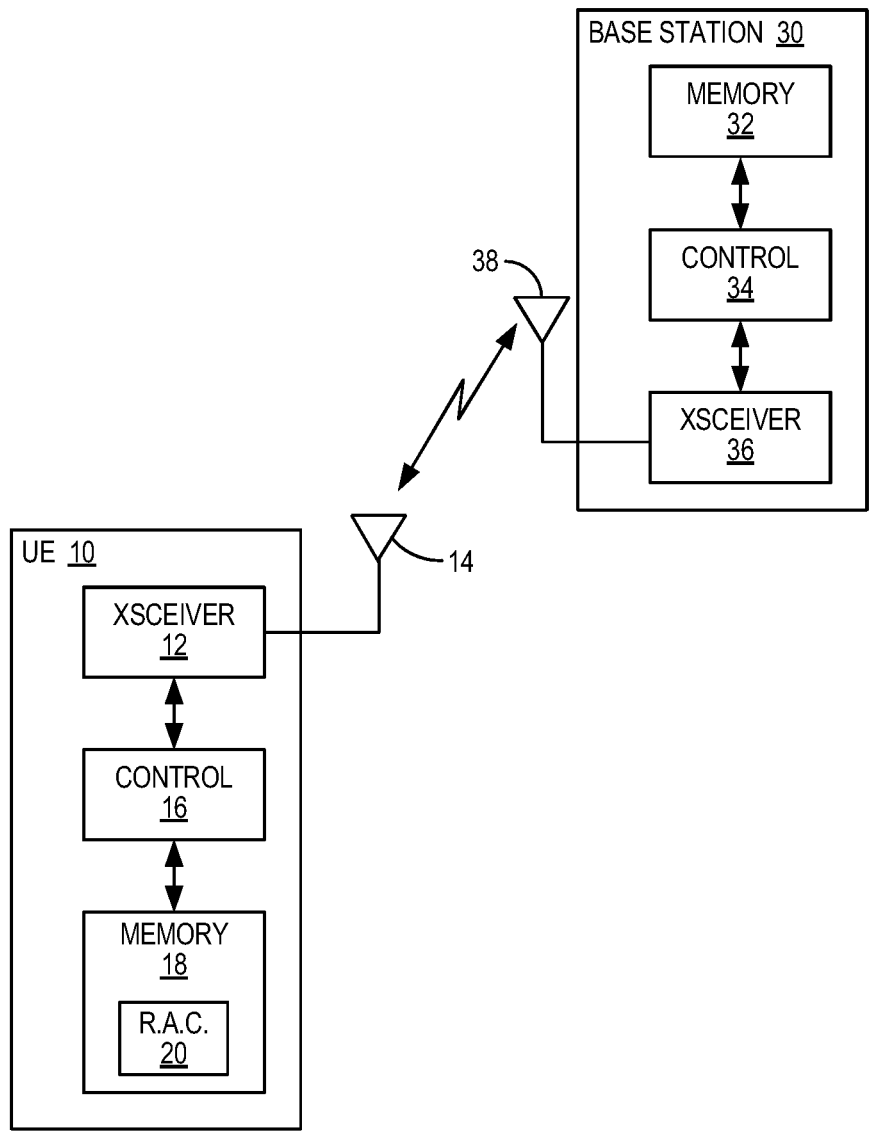
FIG. 3 is a functional block diagram of a UE and base station.

FIG. 3 depicts a representative UE 10 in wireless communication with a base station 30 (also known as a NodeB or eNodeB in LTE). The UE 10 includes a transceiver 12 operative to transmit and receive wireless control and data signals via one or more antenna 14. In one embodiment, the transceiver 12 has a variable transmission power, and is controlled by a controller 16. The controller 16 may comprise a state machine, programmable logic together with appropriate firmware, a general purpose processor or Digital Signal Processor (DSP) together with appropriate software, or any combination thereof. The controller 16 is operative to control overall operation of the UE 10, and to accept release-independent modifications of one or more radio parameters. The controller 16 is operatively connected to memory 18. The memory 18 may comprise solid-state memory such as RAM, ROM, flash, or the like; secondary storage such as magnetic or optical media; or any combination thereof. A portion of the memory 18 may be incorporated in the controller 16, and some memory 18 may be removeably connected to the device 10 (e.g., MMC card). The memory 18 is operative to store operating system and application software executed by the controller 16, as well as various operating parameters and other data.

In particular, a non-volatile portion of the memory 18 is operative to store a Radio Access Capability data structure 20. The Radio Access Capability 20 comprises an information element consisting of a plurality of fields, as depicted in FIG. 1. One field, which may, e.g., be labeled NetworkSignalingVersion, includes an indication of one or more radio parameters for which the UE 10 accepts a release-independent modification. In one embodiment, the NetworkSignalingVersion field includes a bitmap, with each bit position corresponding to a radio parameter, such as a NS-value, an indicating whether the UE 10 accepts a modification of the corresponding parameter.

The mobile UE10 may include many other components and features not depicted in FIG. 3 for clarity, such as user interface features (e.g., keypad, keyboard, display, touchscreen, microphone, speaker, and the like), camera, satellite navigation receiver, graphics processor, and the like.

The UE 10 communicates across an air interface with a base station 30. The base station 30 includes one or more transceivers 36 operative to exchange wireless control and data signals with the UE 10, as well as other UE in a cell controlled by said base station, via one or more antenna 38. Operation of the transceiver is controlled by one or more controllers 34. The controller 34 may be constituted as described above with respect to UE controller 16. The controller 34 is operative to manage a plurality of UE 10. In one embodiment, the controller 34 may accept or deny attachment of a UE 10 in response to a received Radio Access Capability 20 and the UE's acceptance of release-independent modifications to one or more radio parameters, such as NS-values. The controller 34 is operatively connected to memory 32, which may be constituted as described above with respect to UE memory 18. The base station 30 may include numerous circuits and functions not shown in FIG. 3 for clarity, such as interfaces to other network nodes, databases, user interface elements, and the like.

Figure 4:
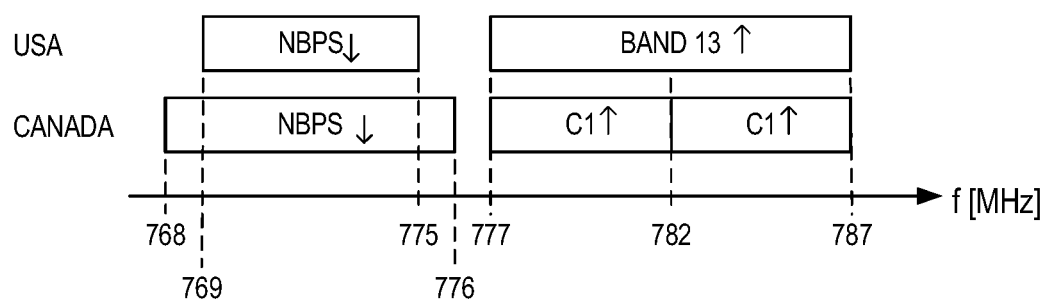
FIG. 4 is a frequency diagram.

As one representative, non-limiting example demonstrating the utility of the present invention, consider the introduction of the US700 band plan in Canada, as depicted in FIG. 4. The uplink spectrum 777-787 MHz (denoted Band 13 in the US) is allocated in two different blocks of 5 MHz each: C1 at 777-782 MHz and C2 at 782-787 MHz (see TS 36.101). In the US, adjacent to Band 13 is spectrum allocated for downlink for Narrow Band Public Safety (NBPS) at 769-775 MHz—a separation from Band 13 of 2 MHz. In Canada, NBPS is allocated at 768-776 MHz—a separation from C1 of only 1 MHz.

In the US, to protect the NBPS from interference by Band 13, Additional Maximum Power Reduction (AMPR) has been introduced in the 3GPP specifications to allow for larger protection to the victim system. This reduces the maximum output power of the UE, to avoid interference in the adjacent NBPS. The power reduction is defined in network signaling NS_07. The limit is −57 dBm/6.25 kHz, and applies to an E-UTRA 10 MHz carrier when NS_07 is signaled.

NS_07 has not been defined for 5 MHz channel bandwidth. Without AMPR, the applicable restriction on emissions is −35 dBm/6.25 kHz at 769-775 MHz, per Federal Communication Commission (FCC) requirements.

Similarly, NBPS protection at 851-859 MHz has been introduced for Band 26 UE. In this case, the power reduction protection level in the 3GPP standards is −53 dBm/6.25 kHz (the regulatory limit being −13 dBm/100 kHz).

Considering three alternatives—−57 dBm/6.25 kHz, −53 dBm/6.25 kHz, and −35 dBm/6.25 kHz—it seems that −53 dBm/6.25 kHz represents a good compromise for NBPS protection from C1 band, at 776 MHz. The emission limits for protection of the Public Safety (PS) spectrum can be defined as:

- −57 dBm/6.25 kHz at 769-775 MHz and −53 dBm/6.25 kHz at 768-776 MHz, or
- −57 dBm/6.25 kHz at 769-775 MHz and −53 dBm/6.25 kHz at 775-776 MHz NS_07 currently defines the emission protection limit of −57 dBm/6.25 kHz between 769-775 MHz for 10 MHz channel bandwidth. To add one of the above protections for the Canadian spectrum allocation, there is a need to include PS protection within 768-776 MHz for 5 and 10 MHz E-UTRA channels. This implies that new AMPR values need to be added. According to the prior art, there are only two ways to accomplish this.

First, NS_07 could be redefined in a future 3GPP standard release. This option has the advantage of re-using the US Band 13 definitions (i.e., globalization of frequency bands). However, since a base station cannot distinguish a UE recognizing the "new" NS_07 from a legacy UE, additional signaling would also have to be defined, and added to the standard, in order to indicate compliance. Otherwise, many UEs must be excluded to ensure interference suppression.

Second, a new operating band could be defined, having the same arrangement as Band 13 but with a new NS value to cover PS protection in the US and Canada for 5 and 10 MHz E-UTRA channels. This option proliferates frequency band definitions and defeats the globalization of existing bands.

According to embodiments of the present invention, however, the Band 13 definition could be adopted in Canada, with a modification to NS_07. A bit in the NetworkSignalingVersion bitmap could be defined to indicate whether a UE complies with the modification of NS_07 to support −53 dBm/6.25 kHz over at least 775-776 MHz (e.g., a "1" in the bitmap), or whether the UE is a legacy UE that supports only the US Band 13 definition, with NS_07 signaling a protection emission level of −57 dBm/6.25 kHz for 10 MHz at 769-775 MHz (a "0" in the bitmap). A UE signaling radio access capability without the NetworkSignalingVersion field would be considered the same as one signaling a "0" bit value for NS_07, and would be excluded by the Canadian base station from attaching to bands C1+C2.

Embodiments of the present invention present significant advantages over the prior art. By UEs signaling their ability to accept modifications or addition of network signaling values, network operators may re-use previously defined operating bands, adopting operating parameters as necessary to regional conditions, and base stations may perform admission control based on UE capabilities. This is release independent, and avoids the proliferation of band identifiers for networks operating in the same frequency ranges.

Although discussed herein with respect to changes/updates to NS-values, those of skill in the art will readily recognize that embodiments of the present invention facilitate release-independent modifications of any network parameter, of which network signaling parameters, or NS-values, are merely one representative example.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of communicating between a base station and user equipment (UE) in a wireless communication network, comprising:
transmitting radio access capability of a UE in an information element comprising a plurality of fields from the UE to a base station in a wireless communication network;
wherein the information element includes a field that is configurable according to one of a plurality of states, the plurality of states comprising:
a first state indicating that the UE supports a predefined definition of a radio parameter;
a second state indicating that the UE supports a subsequent modification to the predefined definition of the radio parameter;
wherein the radio parameter comprises a network signaling (NS) value, that is indicative of an additional maximum power reduction (AMPR) value;
wherein the information element includes an integer vector comprising a plurality of integers, each position in the vector associated with a radio parameter; and
wherein the integers of the integer vector indicate a release number of a 3GPP standard defining a modification or addition of a radio parameter.

2. The method of claim 1, wherein the information element includes a bitmap with a plurality of bit positions mapped to radio parameters.

3. The method of claim 1, wherein each of the plurality of fields in the information element is configurable for respective radio parameters according to the plurality of states.

4. A method of operating a cell of a wireless communication network by a base station, comprising:
receiving, from a user equipment (UE), radio access capability of the UE in an information element comprising a plurality of fields, the information element including a field configurable according to one of a plurality of states, the plurality of states comprising:
a first state indicating that the UE supports a predefined definition of a radio parameter;
a second state indicating that the UE supports a subsequent modification to the predefined definition of the radio parameter; and
managing the UE based on the state of the field;
wherein the radio parameter comprises a network signaling (NS) value, that is indicative of an additional maximum power reduction (AMPR) value;
wherein managing the UE comprises performing admission control on the UE based on the state of the field.

5. The method of claim 4, wherein managing the UE comprises imposing scheduling restrictions on the UE.

6. The method of claim 4, wherein managing the UE comprises imposing restrictions on inter-band handover of the UE.

7. The method of claim 4, wherein the information element includes a bitmap with a plurality of bit positions mapped to radio parameters in a predetermined manner.

8. The method of claim 4:
wherein the information element includes an integer vector comprising a plurality of integers, each position in the vector associated with a radio parameter;
wherein the integers of the integer vector indicate a release number of a 3GPP standard defining a modification or addition of a radio parameter.

9. The method of claim 4, wherein each of the plurality of fields in the information element is configurable for respective radio parameters according to the plurality of states.

10. A user equipment (UE) operative in a wireless communication network, the UE comprising:
a transceiver operative to receive signals from, and transmit signals to, at least one base station in the network;
a memory; and
a controller circuit operatively connected to the transceiver and the memory, the controller circuit operative to cause the transceiver to transmit, to the base station, radio access capability of the UE in an information element comprising a plurality of fields;
wherein the information element includes a field that is configurable according to one of a plurality of states, the plurality of states comprising:
a first state indicating that the UE supports a predefined definition of a radio parameter;
a second state indicating that the UE supports a subsequent modification to the predefined definition of the radio parameter;
wherein the radio parameter comprises a network signaling (NS) value, that is indicative of an additional maximum power reduction (AMPR) value;
wherein the information element includes an integer vector comprising a plurality of integers, each position in the vector associated with the radio parameter; and
wherein the integers of the integer value indicate a release number of a 3GPP standard defining a modification or addition of the radio parameter.

11. The UE of claim 10, wherein the memory is configured to store a data structure that represents the radio access capability of the UE.

12. The UE of claim 10, wherein the information element includes a bitmap with a plurality of bit positions mapped to radio parameters in a predetermined manner.

13. The UE of claim 10, wherein each of the plurality of fields in the information element is configurable for respective radio parameters according to the plurality of states.

14. A base station operative in a wireless communication network, the base station comprising:
a transceiver operative to receive signals from, and transmit signals to, at least one User Equipment (UE);
a memory; and
a controller circuit operatively connected to the transceiver and the memory, the controller circuit operative to:
cause the transceiver to receive, from a UE, radio access capability of the UE in an information element comprising a plurality of fields, the information element including a field that is configurable according to one of a plurality of states, the plurality of states comprising:
a first state indicating that the UE supports a predefined definition of a radio parameter;

a second state indicating that the UE supports a subsequent modification to the predefined definition of the radio parameter;
manage the UE based on the state of the field;
wherein the radio parameter comprises a network signaling (NS) value, that is indicative of an additional maximum power reduction (AMPR) value;
wherein to manage the UE based on the state of the field, the controller circuit is operative to perform admission control on the UE based on the state of the field.

15. The base station of claim 14, wherein the controller circuit is operative to impose scheduling restrictions on the UE in response to the UE's support of the modified radio parameter.

16. The base station of claim 14, wherein the controller circuit is operative to impose restrictions on inter-band handover of the UE based on the state of the field.

17. The base station of claim 14, wherein the information element includes a bitmap with a plurality of bit positions mapped to radio parameters in a predetermined manner.

18. The base station of claim 14:
wherein the information element includes an integer vector comprising a plurality of integers, each position in the vector associated with a radio parameter;
wherein the integers of the integer vector indicate a release number of a 3GPP standard defining a modification or addition of a radio parameter.

19. The base station of claim 14, wherein each of the plurality of fields in the information element is configurable for respective radio parameters according to the plurality of states.

* * * * *